Oct. 17, 1961 P. C. VAN DER WILLIGEN ET AL 3,004,874
COATED WELDING ELECTRODES
Filed Dec. 26, 1957

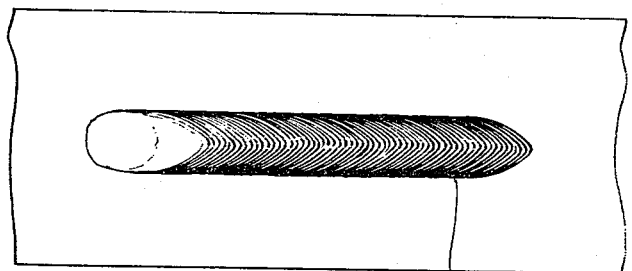

Fig.2

Bead produced by welding with electrode of Fig.1

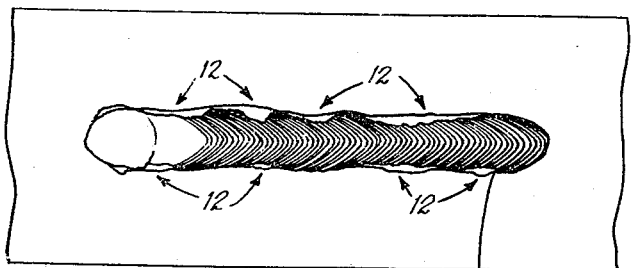

Fig.3

Bead produced by welding with prior art electrode free from $ZrO_2$

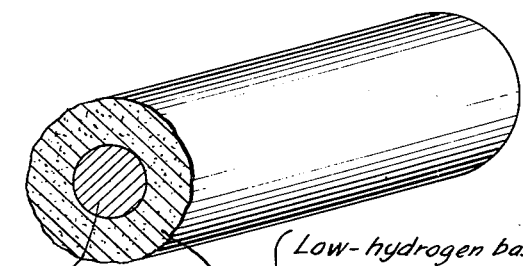

10 Steel Core

11 { Low-hydrogen basic coating with $ZrO_2$ or Zirconium Silicate in amount equivalent to 15 to 30 parts $ZrO_2$ per 100 parts of slag-forming material

Fig.1

INVENTOR
PAUL CHRISTIAAN VAN DER WILLIGEN
WILHELMUS GERARDUS ESSERS
BY
AGENT

3,004,874
COATED WELDING ELECTRODES
Paul Christiaan van der Willigen and Wilhelmus Gerardus Essers, Eindhoven, Netherlands, assignors to North American Philips Company, Inc., New York, N.Y., a corporation of Delaware
Filed Dec. 26, 1957, Ser. No. 705,353
Claims priority, application Netherlands Feb. 1, 1957
14 Claims. (Cl. 117—206)

Our invention relates to coated welding electrodes, and particularly to the coatings of such electrodes.

The invention is particularly concerned with electrodes of the type having coatings in which the slag-forming part is basic and contains an alkaline earth fluoride, and such quantities of alkaline earth carbonate as to produce a protective carbon dioxide atmosphere during the welding. Such a coating which also contains a binder, for example waterglass, and metal powders is substantially free from hydrogen-containing compounds such as water, carbon hydrates and organic binders. Such electrodes are generally referred to as low-hydrogen electrodes because the coatings are substantially free from any compounds which give off hydrogen, except for a minimal amount of water which is not driven off by intensive heating at 300° C. to 500° C., at which temperature the alkaline earth carbonates used do not yet decompose to any considerable degree. In addition to the waterglass, the coatings of electrodes of this type also contain additional silicates, for example $SiO_2$, kaolin and bentonite, and the composition of the slag produced during welding is such that the quantity of the basic oxides, for example CaO, MgO, MnO, $K_2O$ and $Na_2O$ exceeds the total quantity of acid oxides, for example the total quantity of $SiO_2$ and $TiO_2$, both expressed in gram-molecules (Pogodin-Alexejew "Theorie der Schweissprozesse" (1953) pages 184 ff.).

The invention extends to contact electrodes of the type used, for example, in touch-welding in which the electrode rests on the edge of a crater produced in the end of the electrode during the welding, and also to free-arc electrodes which are usually not employed in touch-welding. The electrodes according to invention are suitable for welding steel and a large variety of steel alloys.

The invention has for its object to provide a welding electrode of the aforesaid type having the properties that the slag follows the arc satisfactorily during the welding operation, even if this occurs at a high speed of travel, that the solidified slag may be easily and completely removed from the weld and that the weld itself has a pleasant appearance and excellent mechanical properties.

The electrodes according to the invention, whether of the contact type or free-arc type, have the advantage that the slag readily comes off the fused welding metal in some cases at least a part of the slag coming off on its own accord. Usually a tap of a hammer would be sufficient to cause the slag to come off in large, coherent pieces. The welds produced with our electrodes have a flat and regular appearance and a suitable outline. The electrodes are suitable for A.C. touch welding in which case welds having excellent mechanical properties are produced, and the coating fuses evenly and slag follows the arc satisfactorily during the welding.

According to the invention, we provide coatings of the above general type with a $ZrO_2$ content, i.e. either $ZrO_2$ as such or $ZrO_2$ as present in zirconium silicate, in an amount equal to about 15 to 30% by weight of $ZrO_2$, calculated on the non-metallic part of the coating, or slag-forming material, and also with an amount of silicate equivalent to a $SiO_2$ content not more than 100% by weight of the amount of $ZrO_2$ present.

The terms "non-metallic part" of the coating and "slag-forming materials" are to be understood the part not containing metals, the term "metals" in the present case also including silicon alloys.

We prefer that the $ZrO_2$ be supplied entirely from zirconium silicate which is much cheaper than $ZrO_2$ and occurs in nature, usually in the form of zirconium-orthosilicate ($ZrSiO_4$). Addition of silicates other than zirconium silicate and waterglass, may be omitted in this case.

Particularly desirable slag-properties are obtained when using a binder consisting exclusively of sodium silicate, or with only 25% thereof in the form of potassium silicate. If more potassium silicate is employed this results in an excessive decrease in viscosity of the slag. As is known, the use of potassium is desirable in order to stabilize the welding-arc in welding with alternating current.

When the coatings of electrodes according to the invention contain $ZrO_2$ only in the form of zirconium-orthosilicate, they will always contain considerable amount of $SiO_2$. As a result such electrodes, while giving satisfactory results in flat positioned fillet welding, do not always give satisfactory results when the welding is carried out in other positions. Consequently, in such electrodes we prefer to use coatings in which the $SiO_2$ content amounts at most to 50% by weight of the $ZrO_2$ content and which consequently contain more $ZrO_2$ relative to the quantity of $SiO_2$ than is possible when using zirconium-orthosilicate as the sole source of $ZrO_2$. This may be achieved by using zirconium-orthosilicate together with free $ZrO_2$ in the coating.

Alternatively we may use, a zirconium-silicate in the form of a silicate having a $ZrO_2$ content in excess of the quantity of orthosilicate (approximately 67% by weight) preferably a content in excess of 70% by weight, for example 80% to 84% by weight.

The quantity of alkaline earth fluoride used in our coating—calcium fluoride is preferably used—may be comparatively small, thus greatly diminishing the well-known disadvantages inherent in the use of this material. A quantity of 8% to 16% by weight, calculated upon the non-metallic part of the coating mixture, is sufficient for contact-electrodes. The quantity of alkaline earth carbonate is usually more than twice the quantity of alkaline earth fluoride.

When using iron powder of a type which does not contain reducing metal, we use 5% to 30% by weight of reducing metal, calculated upon the non-metallic part of the composition of the coating. In the case of contact-electrodes, the quantity of iron powder usually amounts to 40% to 65% by weight of the total coating, in which the upper limit depends upon the form and the size of the individual particles and also upon the total quantity of electrically conductive constituents of the coating, since the iron powder-content must not be so high that the coating carries off a substantial part of the welding current to the work piece through the contact point between the coating and the workpiece. The coated electrode will have a thickness approximately corresponding to twice the thickness of the core. Electrodes with a thin core having a diameter of approximately 3 or 4 mms. will, for example, be given an outer diameter of at least 6 mms. and 8 mms. respectively. For thicker cores a coating is employed rendering the electrode slightly thinner than twice the core diameter.

We have found that in a free arc welding electrode according to the invention the content of alkaline earth fluoride of the coating may be less than 10% by weight, calculated upon the non-metallic part of the coating. Excellent results have, for example, been obtained when using a quantity as small as 7% of calcium fluoride.

This has a double advantage:

(a) the stability of the arc becomes better as the quantity of alkaline earth fluoride becomes smaller;

(b) the detrimental fluoride-containing vapours tend to decrease.

The weight ratio between the content of calcium fluoride and calcium carbonate in the coating is preferably smaller than 1:4. This is a result of the low calcium fluoride content. In normal basic coatings without zirconium oxide this ratio is between 1:1 and 1:3.

A coating for such a free arc welding electrode according to the invention having a very low $CaF_2$ content need contain at the most 35% by weight of iron powder, calculated on the weight of the coating.

Both contact-electrodes and free-arc electrodes according to the invention produce slag having distinctive features. For example, at least a part of the surface of the slag facing the welding run has a very typical bright-grey colour, in contradistinction to the dark-coloured upper side. Thereby, this slag and consequently also the electrode according to the invention producing this slag is distinguished from all other known basic slags.

When slags produced when using both contact-electrodes and free-arc electrodes embodying the invention were inspected by means of X-ray diffraction, we found that they contain free $ZrO_2$, even if no free $ZrO_2$ but only zirconium silicate have been added to the coating. This free $ZrO_2$ is present in crystalline form in the slag and, probably, the bright-grey colour of the slag is related thereto.

In order that the invention may be more clearly understood and readily carried into effect, we shall describe the same in connection with several specific examples and with reference to the accompanying drawing in which:

FIGURE 1 is a sectional perspective view of a contact type electrode embodying the invention, FIG. 2 is a plan view of a bead produced when welding with the electrode of FIG. 1, and FIG. 3 is a plan view of a bead produced by welding with a prior-art contact electrode.

The contact electrode shown in FIG. 1 has a core 10 which is of a diameter of about 4 mms. and is made of steel, i.e. mild steel, low-alloy steel, or high-alloy steel. Core 10 is provided in the manner set forth in Example I below with a coating 11 according to the invention.

*Example I*

The coating of FIG. 1 was produced by mixing the following powder quantities:

| | Gms. |
|---|---|
| Fluorspar ($CaF_2$) | 60 |
| Calcspar ($CaCO_3$) | 240 |
| Silico-manganese (70% of Mn, 20% of Si, rest Fe) | 35 |
| Ferro-silicon (45% of Si, rest Fe) | 35 |
| Zirconium silicate (65% of $ZrO_2$, 35% of $CiO_2$) | 160 |
| Iron powder | 550 |

The mixture together with 80 ccs. of sodium silicate and an organic pressing agent was kneaded to form a paste.

This paste was applied to core 10 to form the coating which was dried for one hour in an oven heated at 350° C. at which temperature the organic pressing agent decomposed. The coated electrode had an outside diameter of about 8.3 mms. One of the electrodes was fused, using alternating current of 220 A, onto a flat plate by touch-welding. After the slag layer had been removed by first loosening the same with the tap of a hammer, the welding run had the appearance shown in FIG. 2, from which it appears that the weld had an excellent appearance and a satisfactory flow without any slag rest.

For comparison purposes a weld was made with a prior-art, low-hydrogen contact electrode which was free from $ZrO_2$. This electrode was made by adding iron powder to the coating of an electrode of the hydrogen-free type which was free of iron powder and had given good results in practice. Only a part of this slag produced when using this electrode came off after several hard hammer blows. After chipping off the slag, the bead had the appearance shown in FIG. 3 in which reference numeral 12 indicates slag remnants. In addition, the flow was unsatisfactory and the bead had an irregular outline.

The mechanical properties of the fused welding metal shown in FIG. 2 are found to be even better than the high-grade properties of the welding metal used in FIG. 3.

If 70 gms. of free $ZrO_2$ and 90 gms. of zirconium silicate are substituted for the 160 gms. of zirconium silicate in the composition of Example I, an electrode provided with a coating of the resulting composition will give satisfactory results not only in welding in a flat position, but also in fillet welding in the horizontal position with a satisfactory flat outline. This welding electrode also permits horizontal-vertical butt welding (horizontal welding in a vertical plane) with the same excellent results as in horizontal positioned fillet welding. A substantially equivalentr esult is obtained by replacing the 160 gms. of zirconium silicate having a content of 65% of $ZrO_2$ of Example I by 160 gms. of zirconium silicate having a $ZrO_2$ content of 81% by weight (19% of $SiO_2$).

A free-arc electrode having excellent welding properties was obtained according to the following example:

*Example II*

A soft paste was formed from the following:

| | | |
|---|---|---|
| Fluorspar ($CaF_2$) | gms. | 30 |
| Calcspar ($CaCO_3$) | gms. | 205 |
| Silico-manganese | gms. | 20 |
| Ferro-silicon | gms. | 27 |
| Zirconium silicate | gms. | 143 |
| Iron powder | gms. | 125 |
| Organic pressing agent | gms. | 10 |
| Sodium silicate | ccs. | 42 |
| Potassium silicate | ccs. | 8 |

This paste was applied to a core wire having a diameter of 5 mms. and, after being dried for about one hour at 350° C., the coated electrode had a diameter of about 8.2 mms. The electrode was suitable for welding with a current strength of 230 amps. alternating current (50 c./s.), arc voltage 32 volts. The open circuit voltage of the welding transformer was 80 volts.

It is to be noted that, in the aforesaid compositions, silico-manganese and ferro-silicon are considered as metallic components.

What is claimed is:

1. An arc welding electrode of the low-hydrogen type comprising a steel core, and a coating on said core and containing basic slag-forming material, said material consisting essentially of at least one of the substances selected from the group consisting of zirconium dioxide and zirconium silicate in an amount equivalent to about 15 to 30% by weight of zirconium dioxide calculated on the weight of said material, waterglass as a binder in an amount at which the total amount of silicon dioxide in said material is not more than the amount of zirconium dioxide present, and an alkaline earth carbonate and an alkaline earth fluoride in a weight ratio of at least 2:1.

2. An arc welding electrode of the low-hydrogen type comprising a steel core, and a coating on said core and containing basic slag-forming material, said material consisting essentially of at least one of the substances selected from the group consisting of zirconium dioxide and zirconium silicate in an amount equivalent to about 15 to 30% by weight of zirconium dioxide calculated on the weight of said material, waterglass as a binder in an amount at which the total amount of silicon dioxide in said material is at the most 50% by weight of the amount of zirconium dioxide present, and an alkaline earth carbonate and an alkaline earth fluoride in a weight ratio of at least 2:1.

3. An arc welding electrode of the low-hydrogen type comprising a steel core, and a coating on said core and containing basic slag-forming material, said material consisting essentially of at least one of the substances selected from the group consisting of zirconium dioxide and zirconium silicate in an amount equivalent to about 15 to 30% by weight of zirconium dioxide calculated on the weight of said material, waterglass as a binder in an amount at which the total amount of silicon dioxide in said material is not more than the amount of zirconium dioxide present, and an alkaline earth fluoride and an alkaline earth carbonate in a weight ratio less than about 1:4.

4. An arc welding electrode of the low-hydrogen type comprising a steel core, and a coating on said core and containing basic slag-forming material, said material consisting essentially of at least one of the substances selected from the group consisting of zirconium dioxide and zirconium silicate in an amount equivalent to about 15 to 30% by weight of zirconium dioxide calculated on the weight of said material, waterglass as a binder in an amount at which the total amount of silicon dioxide in said material is not more than the amount of zirconium dioxide present, and calcium carbonate and calcium fluoride in a weight ratio of at least 2:1.

5. An arc welding electrode of the low-hydrogen type comprising a steel core, and a coating on said core and containing basic slag-forming material, said material consisting essentially of zirconium silicate in an amount equivalent to about 15 to 30% by weight of zirconium dioxide calculated on the weight of said material, waterglass as a binder in an amount at which the total amount of silicon dioxide in said material is not more than the amount of zirconium dioxide present, and an alkaline earth carbonate and an alkaline earth fluoride in a weight ratio of at least 2:1.

6. An arc welding electrode of the low-hydrogen type comprising a steel core, and a coating on said core and comprising basic slag-forming material consisting essentially of at least one of the substances selected from the group consisting of zirconium dioxide and zirconium silicate in an amount equivalent to about 15 to 30% by weight of zirconium dioxide calculated on the weight of said material, waterglass as a binder in an amount at which the total amount of silicon dioxide in said material is not more than the amount of zirconium dioxide present, and an alkaline earth carbonate and an alkaline earth fluoride in a weight ratio of at least 2:1, the remainder of the coating consisting essentially of iron powder and a reducing metal.

7. An arc welding electrode of the low-hydrogen type comprising a steel core, and a coating on said core and containing basic slag-forming material, said material consisting essentially of at least one of the substances selected from the group consisting of zirconium dioxide and zirconium silicate in an amount equivalent to about 15 to 30% by weight of zirconium dioxide calculated on the weight of said material, waterglass as a binder in an amount at which the total amount of silicon dioxide in said material is not more than the amount of zirconium dioxide present, said waterglass consisting essentially of sodium silicate and only 25% of potassium silicate, and an alkaline earth carbonate and an alkaline earth fluoride in a weight ratio of at least 2:1.

8. A free-arc welding electrode of the low-hydrogen type comprising a steel core, and a coating on said core and comprising basic slag-forming material consisting essentially of at least one of the substances selected from the group consisting of zirconium dioxide and zirconium silicate in an amount equivalent to about 15 to 30% by weight of zirconium dioxide calculated on the weight of said material, waterglass as a binder in an amount at which the total amount of silicon dioxide in said material is not more than the amount of zirconium dioxide present, and an alkaline earth carbonate and an alkaline earth fluoride in a weight ratio of at least 2:1, the remainder of the coating consisting of reducing metal and iron powder in an amount less than about 35% by weight of the coating.

9. A free-arc electrode as defined in claim 8 in which the reducing metal is between about 5% to 30% by weight of the slag-forming material.

10. A free-arc welding electrode of the low-hydrogen type comprising a steel core, and a coating on said core and containing basic slag-forming material, said material consisting essentially of at least one of the substances selected from the group consisting of zirconium dioxide and zirconium silicate in an amount equivalent to about 15 to 30% by weight of zirconium dioxide calculated on the weight of said material, waterglass as a binder in an amount at which the total amount of silicon dioxide in said material is not more than the amount of zirconium dioxide present, an alkaline earth fluoride in an amount less than about 10% by weight of the material, and an alkaline earth carbonate in an amount at least twice the amount of the fluoride.

11. A free-arc welding electrode of the low-hydrogen type comprising a steel core, and a coating on said core and containing basic slag-forming material, said material consisting essentially of at least one of the substances selected from the group consisting of zirconium dioxide and zirconium silicate in an amount equivalent to about 15 to 30% by weight of zirconium dioxide calculated on the weight of said material, waterglass as a binder in an amount at which the total amount of silicon dioxide in said material is not more than the amount of zirconium dioxide present, an alkaline earth fluoride in an amount less than about 10% by weight of the material, and an alkaline earth carbonate in an amount at least four times the amount of the fluoride.

12. A contact type welding electrode of the low-hydrogen type comprising a steel core, and a coating on said core, the coated electrode having a thickness approximately twice the thickness of the core, said coating containing basic slag-forming material consisting essentially of at least one of the substances selected from the group consisting of zirconium dioxide and zirconium silicate in an amount equivalent to about 15 to 30% by weight of zirconium dioxide calculated on the weight of said material, waterglass as a binder in an amount at which the total amount of silicon dioxide in the material is not more than the amount of zirconium dioxide present, and an alkaline earth carbonate and an alkaline earth fluoride in a weight ratio of at least 2:1, the remainder of the coating being essentially iron powder in an amount of about 40% to 65% by weight of the coating.

13. A contact-type electrode as defined in claim 12 in which the alkaline earth fluoride is between about 8% to 16% by weight of the material.

14. A contact type welding electrode of the low-hydrogen type comprising a steel core, and a coating on said core, the coated electrode having a thickness approximately twice the thickness of the core, said coating comprising slag-forming material consisting essentially of at least one of the substances selected from the group consisting of zirconium dioxide and zirconium silicate in an amount equivalent to about 15 to 30% by weight of zirconium dioxide calculated on the weight of said material, waterglass as a binder in an amount at which the total amount of silicon dioxide in the material is not more than the amount of zirconium dioxide present, and an alkaline earth carbonate and an alkaline earth fluoride in a weight ratio of at least 2:1, the remainder of the coating being essentially iron powder in an amount of about 40% to 65% by weight of the coating, and reducing metal in an amount of about 5% to 30% by weight of said slag-forming material.

References Cited in the file of this patent

UNITED STATES PATENTS

| | | |
|---|---|---|
| 1,467,825 | Armor | Sept. 11, 1923 |
| 1,942,364 | Rood | Jan. 2, 1934 |
| 2,009,240 | Roberts et al. | July 23, 1935 |
| 2,432,773 | Lee | Dec. 16, 1947 |
| 2,544,334 | Linnert | Mar. 6, 1951 |
| 2,586,516 | Cobine | Feb. 19, 1952 |
| 2,697,159 | Donahey | Dec. 14, 1954 |
| 2,730,465 | Van Der Willigen | Jan. 10, 1956 |
| 2,745,771 | Pease et al. | May 15, 1956 |
| 2,761,796 | Wasserman | Sept. 4, 1956 |